US006573970B1

(12) United States Patent
Saitoh et al.

(10) Patent No.: US 6,573,970 B1
(45) Date of Patent: Jun. 3, 2003

(54) LIQUID CRYSTAL DISPLAY DEVICE

(75) Inventors: Goroh Saitoh, Tokyo (JP); Ken-ichi Takatori, Tokyo (JP)

(73) Assignee: NEC Corporation, Tokyo (JP)

( * ) Notice: Subject to any disclaimer, the term of this patent is extended or adjusted under 35 U.S.C. 154(b) by 165 days.

(21) Appl. No.: 09/617,040

(22) Filed: Jul. 14, 2000

(30) Foreign Application Priority Data

Jul. 16, 1999 (JP) ............................................. 11-203460

(51) Int. Cl.[7] ................................................ G02F 1/133
(52) U.S. Cl. ........................ 349/172; 349/174; 345/204; 345/89
(58) Field of Search ................................ 349/172, 174, 349/173, 89; 345/204

(56) References Cited

U.S. PATENT DOCUMENTS 5,877,834 A * 3/1999 Sako et al. .................. 349/171
6,323,850 B1 * 11/2001 Katagura et al. ........... 345/204
6,417,828 B1 * 7/2002 Sato et al. .................... 345/89

FOREIGN PATENT DOCUMENTS

| JP | 61-174294 | 8/1986 |
|----|-----------|--------|
| JP | 61-195187 | 8/1986 |
| JP | 1-500856 | 3/1989 |
| JP | 1-248140 | 10/1989 |
| JP | 7-197025 | 8/1995 |
| JP | 9-151375 | 6/1997 |
| JP | 410195443 A * | 7/1998 |
| JP | 10-279534 | 10/1998 |
| JP | 10-338877 | 12/1998 |

* cited by examiner

Primary Examiner—Robert H. Kim
Assistant Examiner—Thoi Duong
(74) Attorney, Agent, or Firm—Young & Thompson

(57) ABSTRACT

An object of the present invention is to provide a liquid crystal display-device with a high degree of light utilization efficiency (a high numerical aperture), and for which a rapid response is possible at high contrast. A liquid crystal display device incorporating at least one compound with optical activity for which the value of the spontaneous polarization is positive, and at least one compound with optical activity for which the value of the spontaneous polarization is negative, and for which the overall spontaneous polarization may be either positive or negative, is prepared, and is then held between substrates which incorporate electrodes.

5 Claims, 6 Drawing Sheets

LIQUID CRYSTAL DISPLAY DEVICE

BACKGROUND OF THE INVENTION

1. Field of the Invention

The present invention relates to a liquid crystal display device for use in devices such as display apparatus for displaying text and figures and the like, dimmer devices by which the degree of transmittance of incident light is varied, and optical shutters.

2. Description of the Related Art

A display device which utilizes the optical switching phenomenon of a ferroelectric liquid crystal (FLC) has been proposed by N. A. Clark and S. T. Lagerwell (App. Phys. Lett., Vol. 36, p899 (1980)) as a liquid crystal display which can offer a wide viewing angle and a fast response. However, the display device (a surface stabilized ferroelectric liquid crystal (SSFLC) optical device) is bistable, and suffers from the problem that generating a gradation display by controlling the voltage is difficult. To overcome this problem, several methods have been proposed for using an FLC to realize a gradation display. One such example is Japanese Unexamined Patent Application, First Publication No. Hei 6-194693, in which a technique for adding fine particles to a liquid crystal is disclosed. By distributing the fine particles uniformly though the liquid crystal, a dielectric constant distribution is formed, and as a result, a distribution is formed for the effective voltage applied to the liquid crystal. The effective voltage distribution makes a gradation display possible. Furthermore, Japanese Unexamined Patent Application, First Publication No. Hei 9-236830 a technique is disclosed for forming a striped structure within a liquid crystal by reaction with a monofunctional monomer. By providing threshold characteristics which differ for different local regions within the liquid crystal, the striped structure controls the domain surface area generated on voltage application, and therefore makes a gradation display possible. However the aforementioned techniques suffer from problems such as the generation of orientation defects, which is linked to a reduction in contrast resulting from the introduction of foreign material into the liquid crystal, and the suppression of increases in driving voltage.

An alternative liquid crystal material which has an antiferroelectric phase has been reported by Chandani et al. (Jpn. J. Appl. Phys., 28 (1989), L1265), and a display device utilizing an antiferroelectric liquid crystal (AFLC) has also been proposed (Jpn. J. Appl. Phys., 29 (1990), 1757). AFLC materials have tristability based on a phase transition between an antiferroelectric phase and a ferroelectric phase, and by switching between phases under a bias voltage application, a display device can be manufactured in which gradation display can be achieved by voltage control. However, this type of device also suffers from problems such as the necessity for a bias voltage to achieve a gradation display, and the fact that the driving waveform for a high precision display device with a large number of scanning lines is very complex.

In contrast, Inui et al. and Tanaka et al. have reported an AFLC material (hereafter termed a non-threshold AFLC material) for which the curve displaying optical transmittance relative to applied voltage is a V shape (Proceedings of the 21$^{st}$ Liquid Crystal Symposium 2C04, p.222 (1995), and p.250 (1995)). This V shaped characteristic refers to a property wherein, as shown in FIG. 1, application of a positive voltage produces a continuous variation in the transmittance, and application of a negative voltage also produces a continuous variation in the transmittance with the shape of the curve being substantially symmetrical with the curve representing application of a positive voltage across an axis at a voltage of zero volts. A non-threshold AFLC device utilizing this type of material is reported as having no clear threshold for the phase transition, and displaying a small hysteresis characteristic.

Moreover, Takei et al. have reported a 5.5 inch diagonal liquid crystal optical device which combines the above non-threshold AFLC device with a thin film transistor (TFT) (papers presented at the 74$^{th}$ Workshop of The Japan Society for the Promotion of Science, "142$^{nd}$ Committee of Organic Materials for Information Display" ,Section A (liquid crystal materials), p14, 1999).

Typically, non-threshold AFLC materials display high spontaneous polarization values of 100 (nC/cm$^2$) or more, and in the aforementioned liquid crystal optical device which combines a non-threshold AFLC device with a TFT (papers presented at the 74$^{th}$ Workshop of The Japan Society for the Promotion of Science, "142$^{nd}$ Committee of Organic Materials for Information Display" , Section A (liquid crystal materials), p14, 1999), a non-threshold AFLC material with a spontaneous polarization of 229 (nC/cm$^2$) was used. In order to drive this type of non-threshold AFLC material with a high spontaneous polarization value, an electrical charge in proportion to the spontaneous polarization needs to be injected. However, a problem arises in that because there is a limit on the amount of charge that can be supplied from a TFT, charge injections which span several frames become necessary, which slows down the screen display on the liquid crystal display device.

One example of a method for resolving the above problem comprises the addition of a large auxiliary capacitance to a TFT. However, with a large auxiliary capacitance, the numerical aperture of the liquid crystal optical device decreases, meaning the display will darken. Moreover, investigations by the inventors have revealed that as the auxiliary capacitance is increased the RC time constant also increases, and that in order to carry out sufficient writing within a predetermined writing time period, the on-state resistance of the TFT must be lowered and the TFT characteristics improved. Hence, because the capacity value increases, if the on-state current of the TFT can not be sufficiently ensured, then the writing may not be completed within the writing time period. Consequently, if the TFT characteristics are determined, and the spontaneous polarization value of the liquid crystal material and the panel structure are also determined, then a threshold value will exist for the optimum auxiliary capacitance, and an auxiliary capacitance in excess of this threshold value will cause an increase in the RC time constant, a reduction in the injected charge within the writing time period, and as a result a reduction in the charge for writing to the liquid crystal.

In order to enable the driving of a liquid crystal with a high spontaneous polarization, either a TFT with the required characteristics can be used, or alternatively writing can be conducted at a high voltage. However, in such cases the following types of problems arise. Firstly, there is a need to develop new TFTs with suitable characteristics. Secondly, drive circuits which enable the application of a high driving voltage also need to be developed. Even if these two criteria are met, a large charge still needs to be used in order to drive a liquid crystal with a high spontaneous polarization, and consequently the power consumption will be extremely large.

The various problems described above resulting from high spontaneous polarization values are not limited to gradation display devices which use non-threshold AFLC materials, and are also an issue for gradation display devices which use an aforementioned FLC, and AFLC gradation display devices which utilize tristability.

In addition, for AFLC gradation display devices which utilize tristability, it has been shown that the spontaneous polarization needs to be lowered in order to minimize the hysteresis distortion. For example in Japanese Unexamined Patent Application, First Publication No. Hei 10-279534, in order to reduce the hysteresis distortion for an AFLC display device which utilizes tristability, the spontaneous polarization was reduced by using an antiferroelectric composition which incorporates a new racemic compound. However, the spontaneous polarization value using this method was reported in a working example as approximately 116 (nC/cm$^2$), a value which is not low enough. Furthermore, lowering the spontaneous polarization of the liquid crystal material is also being investigated as a way of suppressing a large driving voltage and large power consumption. For example in Japanese Unexamined Patent Application, First Publication No. Hei-9-151375, an antiferroelectric liquid crystal composition which displays a spontaneous polarization value at 30° C. of between 10 (nC/cm$^2$) and 150 (nC/$^2$), an antiferroelectric liquid crystal composition which incorporates between 1.0 (wt %) and 90 (wt %) of a racemic modification of a compound which if optically resolved and made optically active could function as an antiferroelectric liquid crystal compound, and the aforementioned racemic compound, are disclosed for an AFLC display device which utilizes tristability. However, the basis for the prescribed spontaneous polarization value, namely between 10 (nC/cm$^2$) and 150 (nC/cm$^2$), is not disclosed. Furthermore, in Japanese Unexamined Patent Application, First Publication No. Hei-10-195443, an antiferroelectric liquid crystal composition is reported which is formed by mixing a liquid crystal composition having a positive (or negative) spontaneous polarization, and which comprises as the main constituents at least two positive (or negative) spontaneous polarization compounds with different optically active groups, together with a racemic modification of a liquid crystal compound having the same optically active groups as the liquid crystal compounds above. Furthermore, in the case where the liquid crystal composition has a positive (or alternatively negative) spontaneous polarization, the absolute value of the spontaneous polarization is small for a liquid crystal composition formed by further combining at least one compound which has a positive (or alternatively negative) spontaneous polarization and which moreover has an optically active group different from the optically active group of the aforementioned liquid crystal compound. Moreover, the optically active groups of the liquid crystal compounds, and the fact that the absolute value of the spontaneous polarization was less than 135 (nC/cm$^2$) at 30° C. were also disclosed. However even in this case, as in the example described above, no basis for the prescribed spontaneous polarization value is reported. Moreover, in both this example, as well as in the method described in Japanese Unexamined Patent Application, First Publication No. Hei 9-151375, the type of compounds which can be used are severely restricted by a number of factors. Consequently, the chemical structures of the racemic modifications which can be used in Japanese Unexamined Patent Application, First Publication No. Hei 9-151375, and the optically active groups which can be mixed in Japanese Unexamined Patent Application, First Publication No. Hei 10-195443, are limited. Unfortunately, these limitations force limitations on the characteristics of the actual liquid crystal composition itself.

For example, the operational temperature range or usable temperature range for a liquid crystal composition is determined by the operational temperature range or the usable temperature range, or a combination thereof, of the compounds which make up the composition. However, in those cases where either the chemical structure of, or the optically active groups of, the compounds are limited, then the expansion of the operational temperature range or usable temperature range for the liquid crystal composition, or the setting of the temperature range to a specific temperature range becomes difficult. Moreover, this argument is also true for the tilt angle which has a significant effect on the transmittance and the contrast of the liquid crystal display device. All the above techniques relate to AFLC materials for use in AFLC display devices which utilize tristability, but as is outlined above, all have drawbacks. Furthermore, in the case of materials used for non-threshold AFLC display devices, very little is known.

BRIEF SUMMARY OF THE INVENTION

An object of the present invention is to provide a liquid crystal display device with a high degree of light utilization efficiency (a high numerical aperture), and for which a rapid response (a short response time) is possible at high contrast.

A liquid crystal display device of the present invention incorporates at least one compound with optical activity for which the value of the spontaneous polarization is positive, and at least one compound with optical activity for which the value of the spontaneous polarization is negative, wherein the liquid crystal composition, for which the overall spontaneous polarization may be either positive or negative, is held between substrates which incorporate electrodes. Furthermore, another liquid crystal display device of the present invention incorporates at least one compound with optical activity for which the value of the spontaneous polarization is either positive or negative, and at least one racemic modification, wherein the liquid crystal composition, for which the overall spontaneous polarization may be either positive or negative, is held between substrates which incorporate electrodes. In this case, the ratio of R configurations relative to S configurations within the compound with optical activity may be either RS or R<S.

Moreover in the aforementioned liquid crystal display device, the transmittance or the reflectance of the device will vary continuously relative to the applied electric field or voltage. The curve of the applied voltage relative to the transmittance (reflectance) may vary continuously only for a positive or a negative voltage, as shown in FIG. 2, or may be a V shaped curve as shown in FIG. 1. Furthermore, it is also possible that the transmittance (reflectance) is greatest when no voltage is applied, as shown in FIG. 3.

Suitable active elements for use in a liquid crystal display device of the present invention include thin film transistor (TFT) elements, metal-insulator-metal (MIM) elements, and DRAM formed from single crystal silicon. However, the invention is not limited to an active matrix drive, and depending on the ultimate use of the device, driving can also be performed with a simple matrix.

By using the present invention, a high precision liquid crystal display device is achievable which offers a high degree of light utilization efficiency (numerical aperture), high levels of contrast, and a short response time, as well as a wide viewing angle and the ability to display animation.

DETAILED DESCRIPTION OF THE INVENTION

Figure 1:
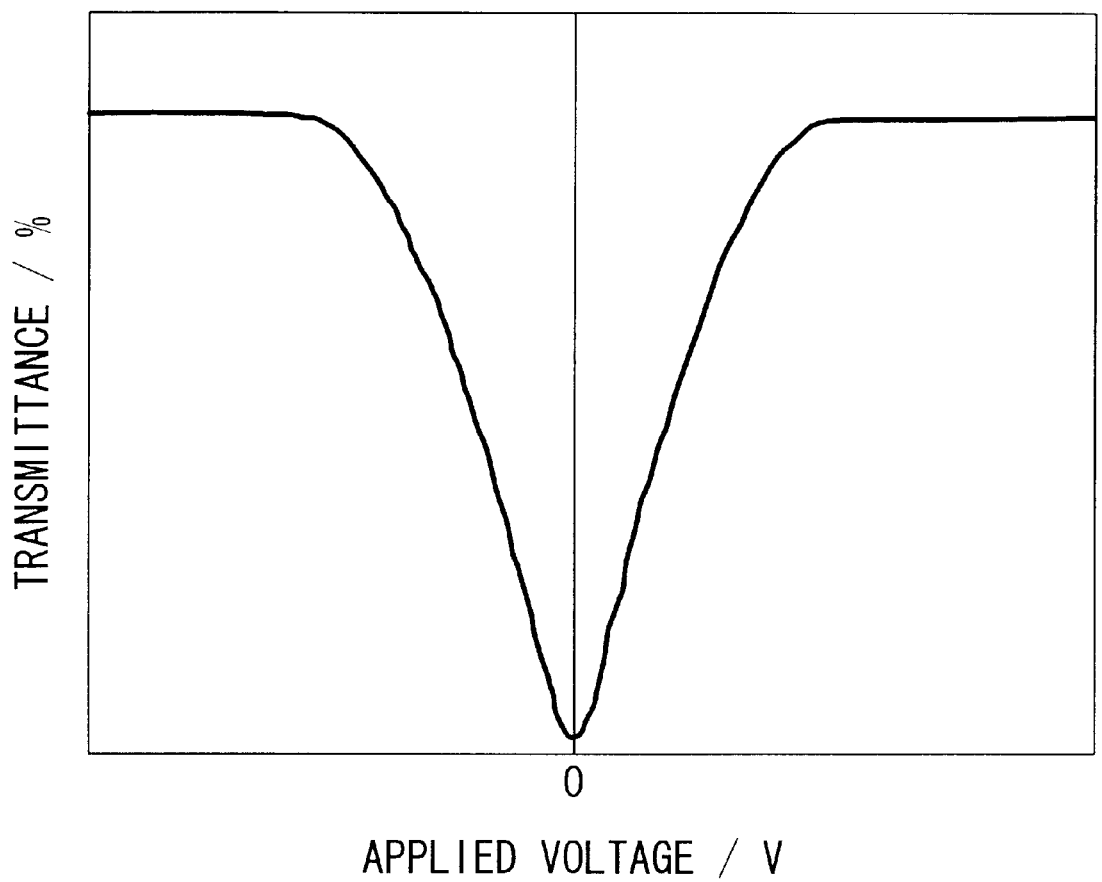
FIG. 1 is a graph showing the V shaped characteristic of the variation of optical transmittance relative to an applied voltage.
Figure 2:
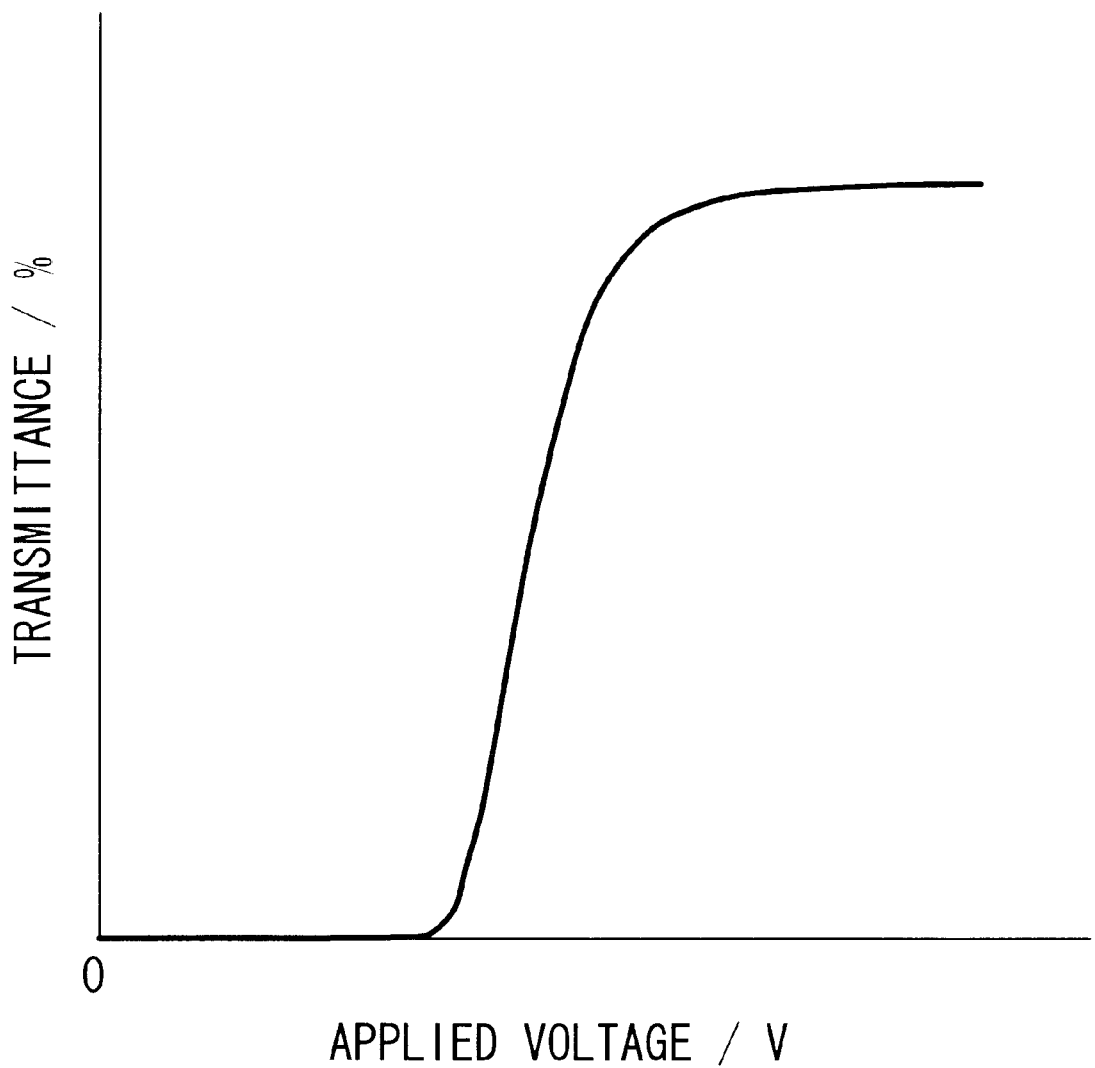
FIG. 2 is a graph showing an example of continuous variation of the transmittance (reflectance) of a device relative to an applied voltage or electric field.
Figure 3:
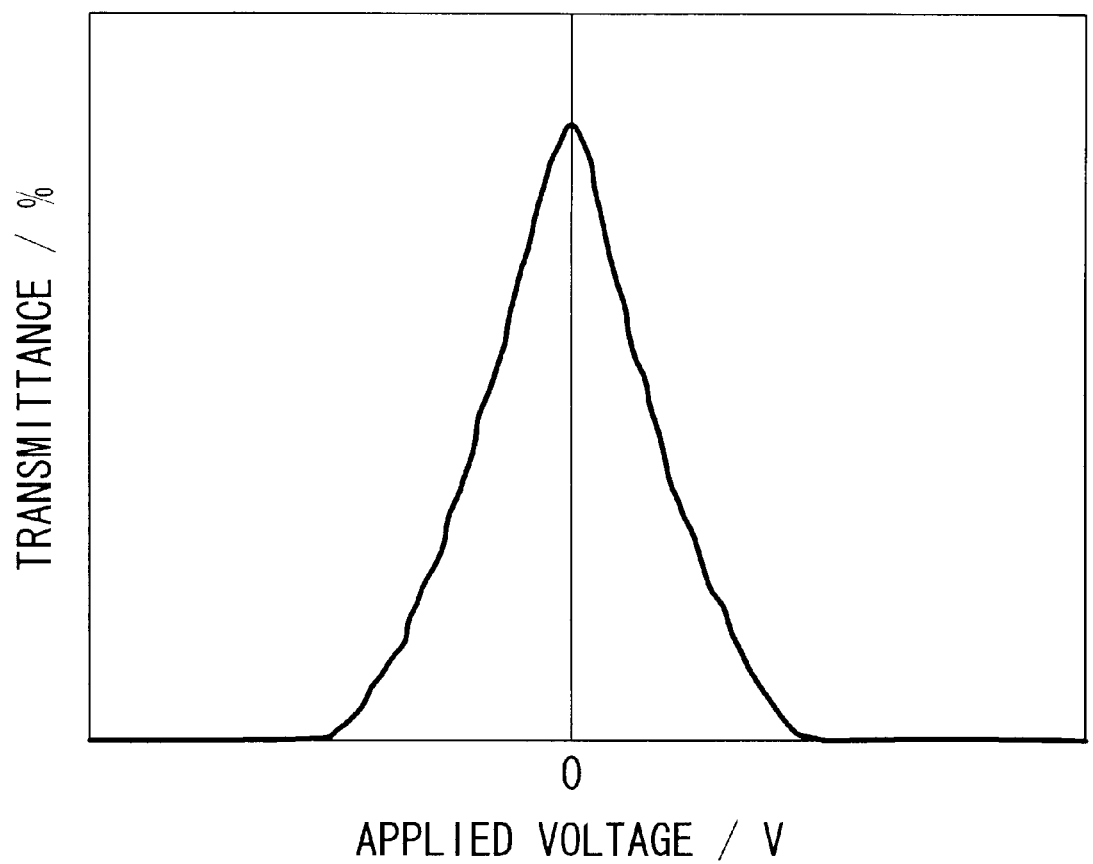
FIG. 3 is a graph showing another example of continuous variation of the transmittance (reflectance) of a device relative to an applied voltage or electric field.

A liquid crystal material used in the present invention is a liquid crystal composition which incorporates at least one compound with optical activity for which the value of the spontaneous polarization is positive, and at least one compound with optical activity for which the value of the spontaneous polarization is negative, wherein the overall spontaneous polarization of the liquid crystal composition may be either positive or negative. The absolute values of the spontaneous polarization values for the compound for which the spontaneous polarization is positive and the compound for which the spontaneous polarization is negative may be such that either (positive compound) (negative compound), or (positive compound)<(negative compound), or (positive compound)=(negative compound). However, in the case where there is one positive optically active compound and one negative optically active compound, it is preferable that the ratio between the positive compound and the negative compound is such that either (positive compound) (negative compound), or (positive compound)<(negative compound). Furthermore, a liquid crystal composition which incorporates at least one compound with optical activity for which the value of the spontaneous polarization is either positive or negative, and at least one racemic modification may also be used, wherein the overall spontaneous polarization of the liquid crystal composition may be either positive or negative. Moreover, for the aforementioned compounds with optical activity, the ratio of R configurations relative to S configurations may be either RS or R<S.

The spontaneous polarization of liquid crystal materials of the present invention will vary depending on the number of scanning lines of the TFT being used, and the response time of the target liquid crystal material, although values of at least 0.06 (nC/cm$^2$), and no more than 96 (nC/cm$^2$) are required. If the value of the spontaneous polarization is less than 0.06 (nC/cm$^2$), then the problem of extremely slow response speed develops. Furthermore, at spontaneous polarization values exceeding 96 (nC/cm$^2$), the number of scanning lines which can be driven decreases, making the material unsuitable for high precision panels. Particularly in the case of high performance displays, which require a large number of scanning lines, a low voltage drive, a wide temperature range, and a fast response, spontaneous polarization values of at least 0.95 (nC/cm$^2$) and no more than 21 (nC/cm$^2$) are preferable.

The spontaneous polarization value described above is determined in the following manner.

The lower limit is determined by response speed. It is required that a response be made within the time for one field during AC drive, that is, within half the time for one frame. Typically, a frame frequency is 30 (Hz), and consequently a response of no longer than $(1/30) \times 10^3/2 \approx 16.7$ (ms) is required. The response speed can be determined from the following formula, in the same manner as for a SSFLC.

$$\tau = \frac{\eta}{Ps \cdot E} \quad (1)$$

Under conditions of a liquid crystal material viscosity $\eta$ of 100 (mPa·s), a voltage of 20 (V), and a cell gap of 2 ($\mu$m), the electric field E will be $10^7$ (V/m), and if the spontaneous polarization Ps is less than 0.06 (nC/cm$^2$) then the response speed $\tau$ will increase beyond 16.7 (ms). If the desired temperature range is broad, and the viscosity is increased from the above value to 400 (mPa·s), then under conditions of a low voltage drive with a voltage of 5 (V), and a cell gap of 2 ($\mu$m), if the spontaneous polarization is less than 0.95 (nC/cm$^2$) then the response speed will increase beyond 16.7 (ms), making a response within 1 field impossible.

In contrast, the upper limit is determined by factors relating to the writing charge distribution. The writing charge from a TFT comprises two types of charges, a charge Q1 which is accumulated in the cell capacitance and which functions as an electrostatic capacitance with no spontaneous polarization, and a polarization charge Q2 resulting from a slight response of spontaneous polarization within the writing time, and both of the charges are written during the writing time period. The charge Q1 for writing to the electrostatic capacitance is determined from the following formula, wherein the cell capacitance is denoted Cs, the write voltage is denoted Vd, the on-state resistance of the TFT is denoted Ron, and the writing time is denoted $\tau$ g.

$$Q1 = Cs \cdot Vd \left[ 1 - \exp\left(-\frac{\tau g}{Cs \cdot Ron}\right) \right] \quad (2)$$

Typically, more than 99% of the writing is completed and so:

$$Q1 \approx Cs \cdot Vd \quad (3)$$

The charge Q2 which flows as a result of a response by the spontaneous polarization Ps within the writing time, is represented by 1/k of the total charge resulting from the spontaneous polarization (Ps·S), where S denotes the surface area of a cell. When the liquid crystal response has been completed, the spontaneous polarization has undergone a complete response, and the voltage between both ends of the cell decreases due to the effect of a reverse electric field resulting from the spontaneous polarization. The charge within the cell in such a state comprises two types of charge, namely a charge Q3 resulting from spontaneous polarization, and a charge Q4 being the remaining charge within the electrostatic capacitance. If the final voltage between both ends of the cell is denoted Vs, then Q4=Cs·Vs, and Q3=Ps·S. This then ensures the preservation of the charge with:

$$Q1+Q2=Q3+Q4 \quad (4)$$

If the dielectric constant of a vacuum is denoted $\epsilon_0$, the dielectric constant of the liquid crystal is denoted $\epsilon_{lc}$, the thickness of the liquid crystal layer is denoted $d_{lc}$, the dielectric constant of an orientation layer is denoted $\epsilon_{ol}$, and the thickness of the orientation layer is denoted $d_{ol}$, then in the case where an orientation layer is provided on both substrates, the cell capacitance Cs is determined by the following formula.

$$Cs = \varepsilon_0 \cdot s \bigg/ \left(\frac{d_{lc}}{\varepsilon_{lc}} + \frac{2d_{ol}}{\varepsilon_{ol}}\right) \quad (5)$$

From the above relationships, the following formula, for calculating the spontaneous polarization, can be determined.

$$Ps = \frac{k}{k-1} \cdot (Vd - Vs) \cdot \varepsilon_0 \bigg/ \left(\frac{d_{lc}}{\varepsilon_{lc}} + \frac{2d_{ol}}{\varepsilon_{ol}}\right) \quad (6)$$

Hereafter the assumptions are made that k=4, that is, that ¼ of the entire spontaneous polarization responds within the writing time, and furthermore that $d_{lc}$=2 ($\mu$m), $d_{ol}$=50 (nm), $\epsilon_{lc}$=10, $\epsilon_{ol}$=3, and Vs=1(V). If sufficient voltage can be applied, and Vd is set to Vd=20 (V) then Ps=96.1 (nC/cm$^2$). In contrast if the voltage is such that Vd=5 (V) then Ps=20.2 (nC/cm$^2$). The aforementioned upper limit value is determined based on these results.

If a large auxiliary capacitance is added, then the value of Cs can be increased, and consequently the value of the spontaneous polarization which can be written, as represented by formula (6), could also be increased. However, as described above, increasing the auxiliary capacitance beyond a constant value, increases the writing time constant (the RC time constant) from the TFT as shown in formula (2). As a result, the degree of writing is insufficient, and the assumption in formula (3) of a writing rate of at least 99% can not be met. Under such conditions, the writing charge Q1 from the TFT will not increase greatly, and as is evident from the charge preservation formula of formula (4), the form of the formula (6) will then alter, and the spontaneous polarization value will not increase significantly.

A liquid crystal display device of the present invention is not limited to optical transmittance type structures in which a liquid crystal layer is held between two transparent substrates which each incorporate an electrode, but can also be applied to optical reflection type structures in which one of the substrates is opaque. This type of construction includes, for example, a device construction in which a liquid crystal layer is held between one transparent substrate comprising an electrode, and one reflective substrate comprising an electrode, as well as a device construction in which a liquid crystal layer is held between one transparent substrate comprising an electrode, and one light absorbing substrate comprising an electrode.

Conventional techniques can be applied to the construction of the devices. Materials such as indium tin oxide (ITO) can be used for the electrodes, but thin films of organic conductive materials such as polypyrrole may also be used. Furthermore, in those cases where the substrate used is itself conductive, then the substrate can also be used as the electrode. The electrode is provided adhered to a light modulation layer. The electrode bearing substrates should preferably be treated so that the liquid crystal is oriented. It is preferable if both substrates are homogeneously oriented, although depending on the use for the device, different orientations may be acceptable. Typical orientation layers such as polyimides, which are used for TN liquid crystals and STN liquid crystals, can be used for the orientation processing, but materials with low pre-tilt angles are particularly desirable.

Suitable polyimide orientation layers include soluble type films in which a polyimide or the like is dissolved in a solvent, as well as calcinated type films having undergone calcination and polyimidization. Furthermore the conducting of orientation processing such as rubbing is also desirable.

Suitable materials for the substrates used in the present invention include glass, plastic, and metals. Furthermore, the substrates can also be colored by either using substrates which comprise a color filter, or by dispersing dyes or pigments through the substrate. The substrate is constructed so that the electrode is positioned on the light modulation layer side of the substrate.

The setting of the spacing between the substrates can be carried out using the same type of rod shaped or spherical shaped spacers, formed from glass or a polymeric resin, as those used in typical liquid crystal devices. The spacing should preferably be within the range 1 $\mu$m to 4 $\mu$m.

Provided a light reflective substrate is constructed of a material which will reflect light, then either an inorganic material or an organic material may be used. Furthermore, the reflection intensity or the reflection wavelength can be altered as necessary depending on the device characteristics desired. The structure of a light reflective substrate can be such that the reflective material is used to form the entire light reflective substrate, or alternatively the reflective material can be formed as a coating on a substrate of a separate material such as glass. In the case where the light reflective material is used as a coating, there is no necessity for the light reflective material to be provided on the liquid crystal layer side. Furthermore for substrates which have been coated with a light reflective material, there is no necessity for the substrate to be transparent in those cases where the reflective material is not positioned on the light modulation layer side of the substrate.

Provided a light absorbing substrate is constructed of a material which will absorb light, then either an inorganic material or an organic material may be used. Furthermore, the absorption intensity or the absorption wavelength can be altered as necessary depending on the device characteristics desired. The structure of a light absorbing substrate can be such that the absorbing material is used to form the entire light absorbing substrate, or alternatively the light absorbing material can be formed as a coating on a substrate of a different material such as glass. In the case where the light absorbing material is used as a coating, there is no necessity for the light absorbing material to be provided on the liquid crystal layer side. Furthermore for substrates which have been coated with a light absorbing material, there is no necessity for the substrate to be transparent in those cases where the light absorbing material is not positioned on the liquid crystal layer side of the substrate. In those cases where the light reflective layer or light absorbing layer is conductive, the layer can be utilized as an electrode.

In a liquid crystal display device of the present invention, the transmittance (reflectance) of the device varies continuously relative to an applied voltage or electric field. Consequently, gradation display is possible. Furthermore, by combination with active elements such as thin film transistor (TFT) elements, or metal-insulator-metal (MIM) elements, liquid crystal display apparatus can be produced.

Figure 4:
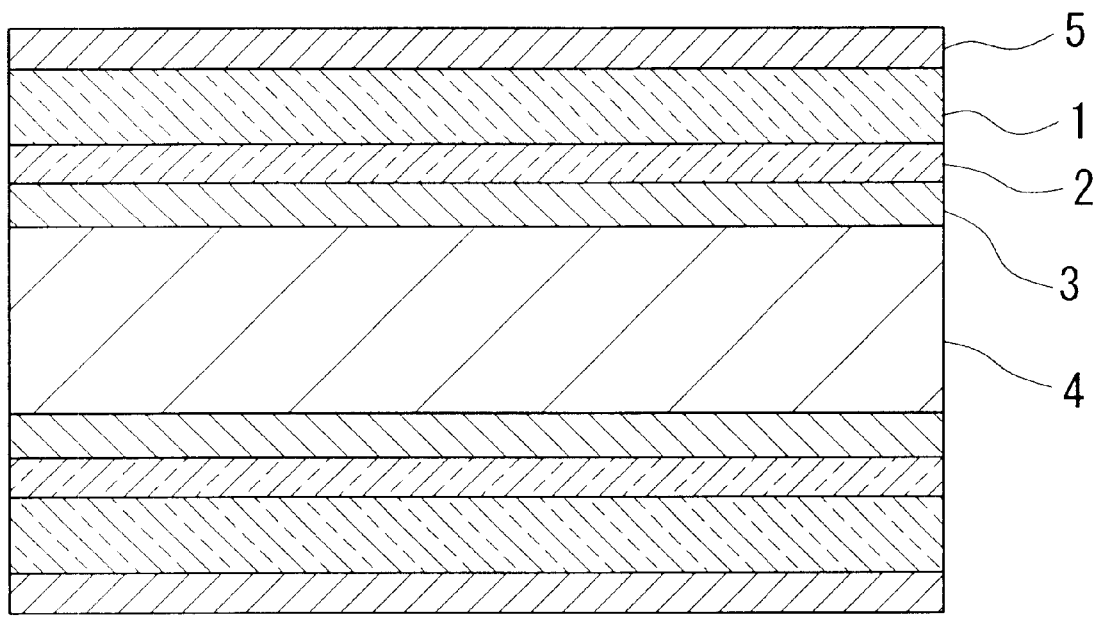
FIG. 4 is a cross-sectional diagram showing the construction of a liquid crystal display device according to the present invention.

As follows is a description of an example construction which utilizes a liquid crystal display device of the present invention, with reference to the drawings. FIG. 4 is a cross-sectional diagram showing the construction of a liquid crystal display device. As can be seen from FIG. 4, a transparent electrode 2 is formed on each of a pair of transparent substrates 1, and an orientation layer 3 is formed on the transparent electrode 2 (in the example shown in the drawing, an orientation layer is formed on both substrates, but the device may also be constructed with an orientation layer formed on only one substrate), and the two transparent electrodes 2 are then arranged facing one another to form a liquid crystal cell. A liquid crystal material 4 is held inside the liquid crystal cell. A pair of polarizing plates 5 are then bonded to the respective transparent substrates on the external faces of the liquid crystal cell to complete the construction of the liquid crystal display device.

Figure 5:
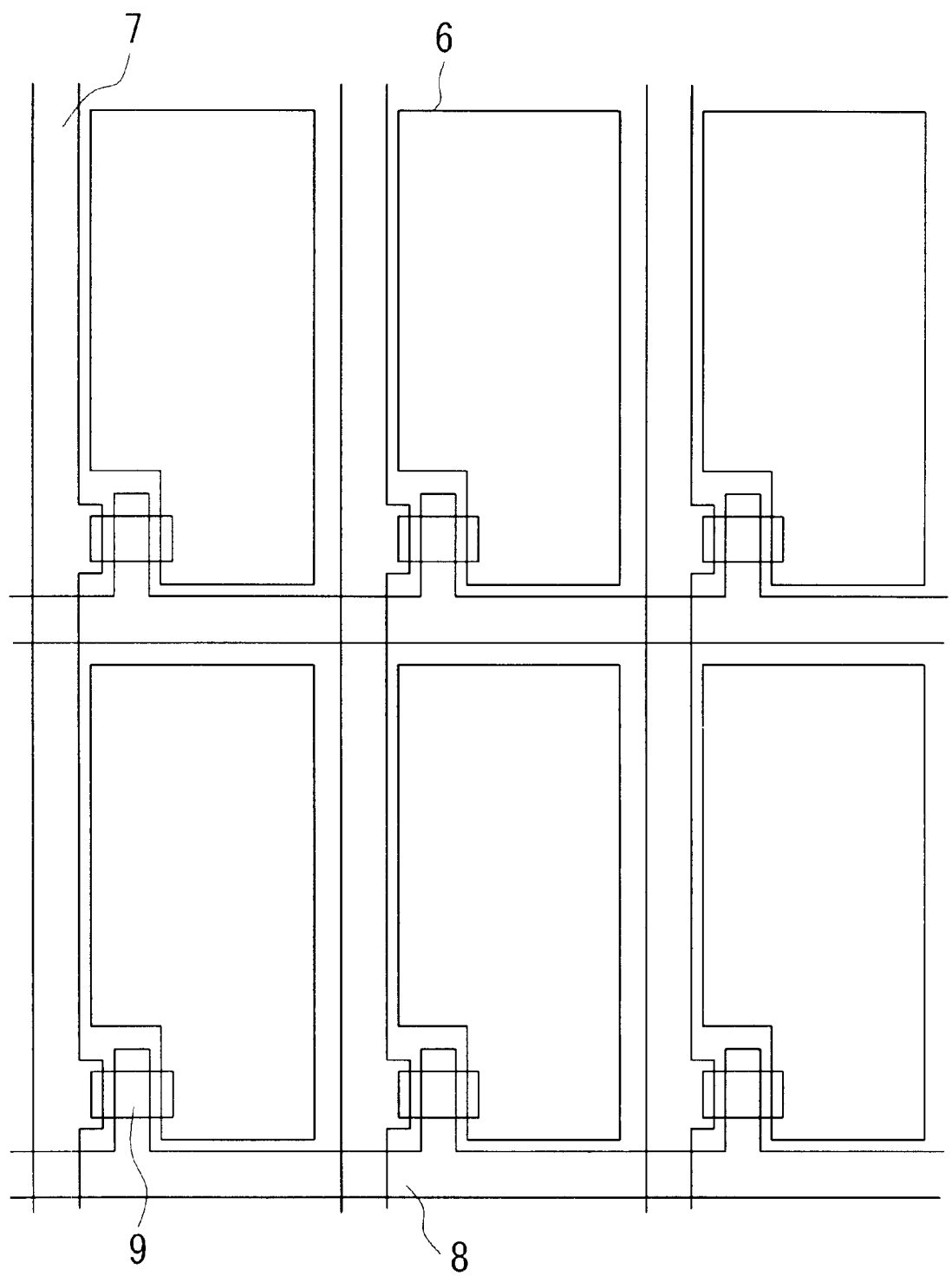
FIG. 5 is an explanatory diagram showing a thin film transistor array according to a first working example of the present invention.

FIG. 5 is a diagram showing the construction of a TFT array in which a liquid crystal display device of the present invention is combined with a TFT array substrate. The structure comprises a TFT substrate and an opposing substrate, and as is shown in the diagram, the TFT substrate comprises a gate bus line 8, a drain bus line 7, and a TFT array 9, and each pixel has at least one pixel electrode 6. Inside the liquid crystal panel, a liquid crystal material is uniformly oriented within the pixels, and the transmittance (reflectance) of the device varies continuously relative to an applied voltage or electric field. The operation of this embodiment is as follows. To each drain bus line is applied a waveform which corresponds to each gate line, the waveform being formed by dividing a drive at a predetermined frequency (typically 30 Hz, although this may be altered to 60 Hz or more if flicker is taken into consideration, or to a three fold 180 Hz or greater for field sequential display, or alternatively may be reduced to a lower frequency in the case of a slow liquid crystal response) by the number of gate lines. In contrast, to each gate bus line is applied a waveform which switches on the TFT switch when that line is selected, and as a result the drain line waveform is applied to the liquid crystal via the display electrode. A voltage is then retained in the liquid crystal section until the gate line is selected again. Consequently, retention of the display is possible even if the liquid crystal has no memory. Furthermore, because an analog gradation display in which the transmittance (reflectance) varies continuously relative to an applied voltage or electric field is possible, a gradation display can be realized by applying to the data base line a waveform which corresponds with each gradation. With the present invention, because the spontaneous polarization of the liquid crystal material is low, a large auxiliary capacitance is unnecessary. Furthermore, for the same reason, charge injection can be conducted within a single frame. Hence, a short response time for the liquid crystal material itself is achieved, meaning the response time for the liquid crystal display device is able to be shortened.

WORKING EXAMPLES

As follows is a further, detailed description of the present invention using working examples. However, the present invention is not limited to the working examples described below and includes other constructions which retain the gist of the present invention.

Working Example 1

Using chromium (Cr) formed by sputtering methods, a 480 strand gate bus line and a 640 strand drain bus line were formed with a line width of 10 $\mu$m, with silicon nitride (SiN$_x$) used as a gate insulation film. The size of a single pixel was set to a height of 330 $\mu$m and a width of 110 $\mu$m, and amorphous silicon used to form a TFT (thin film transistor). A pixel electrode was formed by sputtering using a transparent electrode of indium tin oxide (ITO). By forming an array of TFTs in this manner on a glass substrate, a first substrate was produced. On a second substrate, which opposes the first substrate, was formed a light shielding film comprising chromium, followed by a transparent electrode (common electrode) of ITO, and a color filter, which was formed in a matrix shape using staining techniques. A silica protective layer was then provided on top of the color filter. Subsequently, polyamic acid was applied using spin coating techniques, and was then baked at 200° C. to form a polyimide film by imidization. The polyimide film was then subject to parallel rubbing using a nylon buffing material wound about a roller of diameter 150 mm, and with a roller rotational frequency of 500 rpm, a stage displacement speed of 50 mm/second, and an indentation of 1.0mm, with the rubbing process being conducted twice. The thickness of the orientation layer as measured by a contact level difference meter was approximately 500 Å, and the pre-tilt angle as measured by crystal rotation techniques was approximately 1°. Onto one of the pair of glass substrates were dispersed micropearl (brand name) spherical spacers of a diameter of approximately 2 $\mu$m, and onto the other glass substrate was applied a thermosetting sealant with cylindrical, glass, rod spacers of diameter of approximately 2 $\mu$m dispersed therein. The two substrates were then positioned facing one another so that the rubbing processing directions thereof were arranged for parallel rubbing, and the sealant was then hardened by heat treatment to generate a panel with a gap of 2 $\mu$m. Into this panel was injected, under vacuum conditions, a liquid crystal composition 1 (a liquid crystal composition comprising a liquid crystal compound A with a spontaneous polarization of +215 (nC/cm$^2$), a liquid crystal compound B with a spontaneous polarization of +179 (nC/cm$^2$), and a liquid crystal compound C with a spontaneous polarization of −206 (nC/cm$^2$), wherein the composition has a V shaped characteristic, and a spontaneous polarization of +7.7 (nC/cm$^2$)) in an isotropic phase (Iso) state. The display of the thus obtained liquid crystal panel had a contrast ratio of greater than 100, and a wide viewing angle. Furthermore, the display showed no burning or after image. Because there were 480 scanning lines, the TFT writing time, at 30 ($\mu$s), was shorter than for previously reported liquid crystal display devices with V shaped characteristics. However, because the spontaneous polarization was significantly smaller than previously reported devices, sufficient charge was able to be supplied within the writing time period.

Comparative Example 1

A panel was produced by injecting a liquid crystal composition 2 (a liquid crystal composition with a V shaped characteristic and a spontaneous polarization of 162 (nC/cm$^2$)) into a liquid crystal panel produced in the same manner as that described for the working example 1. The display was almost unrecognizable. Measurements revealed a contrast ratio of less than 5. It is thought that because the spontaneous polarization was large, charge could not be supplied within the short writing time.

Working Example 2

Figure 6:
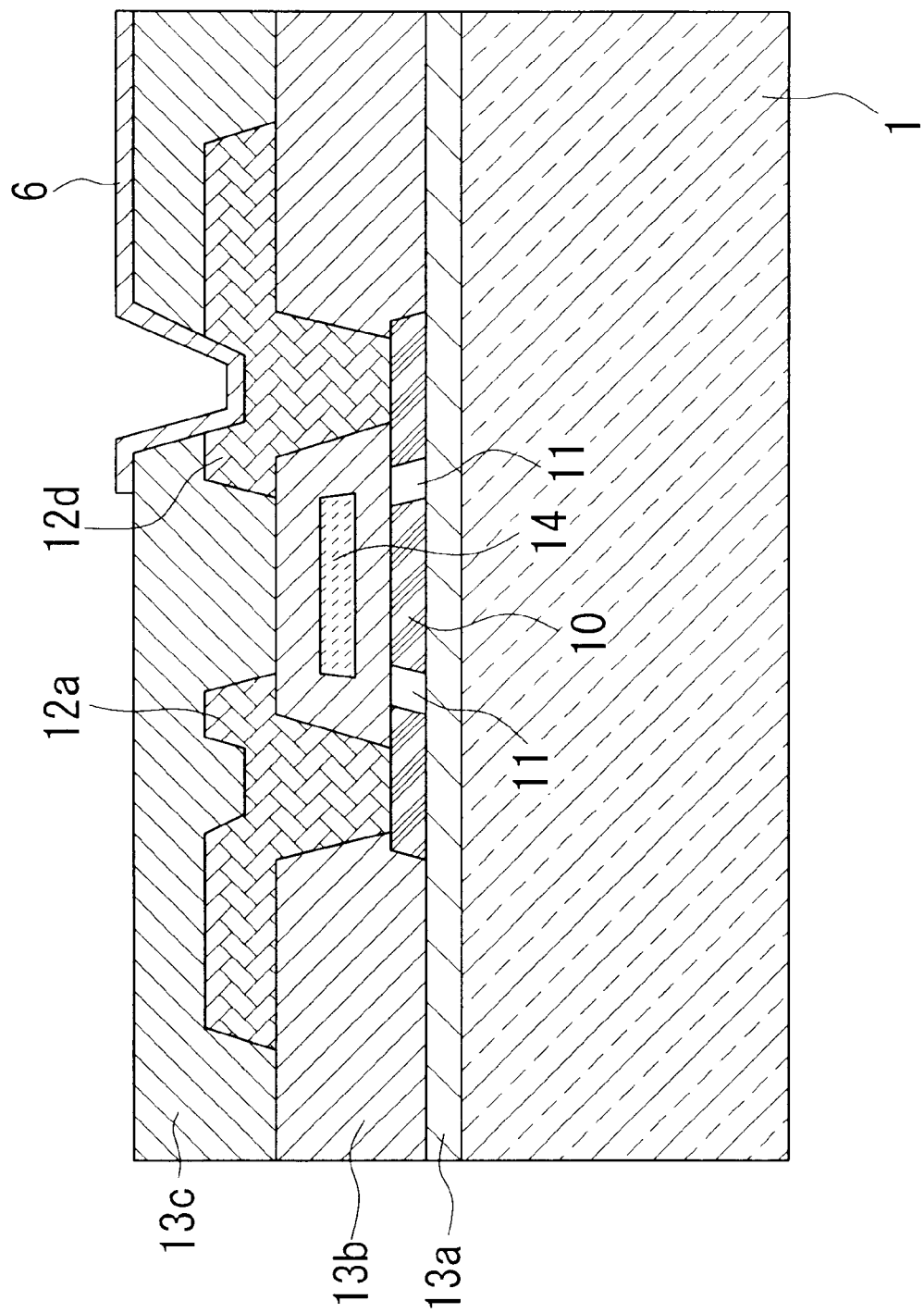
FIG. 6 is a diagram showing the cross-sectional structure of a planar type polysilicon TFT switch used in a second working example of the present invention.

For this working example a polysilicon (polycrystalline silicon, poly Si) )TFT array was produced, and a liquid crystal material 3 (a liquid crystal composition comprising a liquid crystal compound B with a spontaneous polarization of +179 (nC/cm$^2$), a liquid crystal compound C with a spontaneous polarization of −206 (nC/cm$^2$) and a liquid crystal compound D with a spontaneous polarization of +200 (nC/cm$^2$), wherein the composition has a V shaped characteristic, and a spontaneous polarization of +1.1 (nC/cm$^2$)) with a particularly small spontaneous polarization was driven. Specifically, following formation of a silicon oxide layer 13a on a glass substrate (transparent substrate 1), amorphous silicon was grown. Next, annealing was conducted with an excimer laser and the amorphous silicon converted to polysilicon 10, after which a layer of silicon oxide of thickness 100 Å was grown. Following patterning, a photoresist was patterned at a size slightly larger than the gate shape (to allow for subsequent formation of an LDD region 11), and a source region 12a and a drain region 12b were then formed by doping of phosphorus ions. Following formation of another silicon oxide film, microcrystal silicon 14 ($\mu$-c-Si) and tungsten silicide (WSi) 14 were grown, and patterned into a gate shape. An LDD region 11 was then formed by using the patterned photoresist to conduct doping of phosphorus ions only within the necessary region. Following continuous growth of a silicon oxide layer 13b and a silicon nitride layer 13b, contact apertures were opened, and aluminium and titanium formed via sputtering and subsequently patterned. A silicon nitride layer 13c was formed, contact apertures were opened, and then transparent electrodes of ITO formed as the pixel electrodes 6, and subsequently patterned. In this manner, a planar type TFT pixel switch such as that shown in FIG. 6 was produced, enabling production of a TFT array. Only a pixel array of TFT switches was provided on the glass substrate and a drive circuit was not provided within the substrate, and the substrate was mounted externally via a single crystal of silicon. A TFT array substrate produced in this manner, and an opposing substrate comprising an opposing electrode of ITO which is patterned across the entire surface thereof and a light shielding patterning layer of chrome, were prepared. A patterned column of 1.8 $\mu$ was produced on the side of the opposing substrate, to act as a spacer and provide shock resistance. Furthermore, an ultraviolet light curable sealant was applied to the outer section of the opposing substrate pixel region. Following bonding of the TFT substrate and the opposing substrate, the liquid crystal material 3 was injected in an isotropic phase (Iso) state. The display thus obtained showed no burning or after image, and had a wide viewing angle (and a contrast ratio of greater than 100).

Working Example 3

In a working example 3, a micro display and a reflective type projector were produced. The micro display was produced in the same manner as the micro display from Displaytech, Inc. which was shown on the opening page of the January 1997 edition of the "Advanced Imaging" journal. Specifically, a DRAM was first produced by forming MOS-FET on the surface of a silicon wafer in accordance with a 0.8 $\mu$m design rule. A die size of ½ inch was used and a pixel pitch of approximately 10 $\mu$m, and a 1 megabyte-DRAM formed. The numerical aperture for the pixels was greater than 90%. The DRAM was then smoothed by using chemical mechanical polishing techniques. In contrast, an opposing substrate used a microscope viewing cover glass. A section to incorporate a drive circuit was cut out of a silicon wafer, an orientation layer printed on using a soluble polyimide, and then baked at 170° C. to remove the solvent. The polyimide film was then subject to rubbing using a nylon buffing material wound about a roller of diameter 150 mm, and with a roller rotational frequency of 500 rpm, a stage displacement speed of 30 mm/second, and an indentation of 0.8 mm, with the rubbing process being conducted twice. The thickness of the orientation layer as measured by a contact level difference meter was approximately 500 Å, and the pre-tilt angle as measured by crystal rotation techniques was approximately 1.5°. A thermosetting sealant with cylindrical, glass, rod spacers of a diameter of approximately 2 $\mu$m dispersed therein was then applied. The substrates were then positioned facing one another without being in contact, and the sealant was then hardened by ultraviolet light treatment to generate a panel with a gap of 2 $\mu$m. Into this panel was injected, under vacuum conditions, the liquid crystal composition 1 in an isotropic phase (Iso) state.

With the liquid crystal composition still in the isotropic (Iso) phase, a selected waveform generator and a high output amplifier were used to apply a rectangular waveform of frequency 3 Hz and an amplitude of ±10V to the entire surface of the panel, and with the electric field applied, the panel was then cooled gradually to room temperature at a rate of 0.1° C./min. Moreover, by using 3 colored light emitting diodes, a collimate lens for obtaining a parallel light beam, a polarization modulation device, and a projection lens, a reflective field sequential projector was produced. Using this method enabled a rapid response projector display to be achieved.

What is claimed is:

1. A liquid crystal display device comprising a liquid crystal composition which incorporates at least one compound with optical activity for which the value of a spontaneous polarization is positive, and at least one compound with optical activity for which the value of a spontaneous polarization is negative, and for which an overall spontaneous polarization may be either one of positive and negative, wherein said liquid crystal composition is held between substrates which incorporate an electrode, and wherein either one of transmittance and reflectance of said device vary continuously relative to an applied electric field, and said device has a non-threshold characteristic.

2. A liquid crystal display device according to claim 1, wherein a weight ratio of an R configuration compound (R) to an S configuration compound (S) contained in said optically active compounds is either one of R>S or R<S.

3. A liquid crystal display device according to claim 1, wherein an absolute value of a spontaneous polarization of said liquid crystal composition is at least 0.06 (nC/cm$^2$), and no more than 96 (nC/cm$^2$).

4. A liquid crystal display device according to claim 1, wherein an absolute value of a spontaneous polarization of said liquid crystal composition is at least 0.95 (nC/cm$^2$) and no more than 21 (nC/cm2).

5. A liquid crystal display device according to claim 1, wherein means for applying an electric field is provided with an active element.

* * * * *